United States Patent
Mei et al.

(10) Patent No.: US 8,831,349 B2
(45) Date of Patent: *Sep. 9, 2014

(54) GESTURE-BASED VISUAL SEARCH

(71) Applicant: Microsoft Corporation, Redmond, WA (US)

(72) Inventors: Tao Mei, Beijing (CN); Shipeng Li, Palo Alto, CA (US); Ying-Qing Xu, Beijing (CN); Ning Zhang, Toronto (CA); Zheng Chen, Beijing (CN); Jian-Tao Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,259

(22) Filed: Sep. 5, 2013

(65) Prior Publication Data

US 2014/0003714 A1  Jan. 2, 2014

Related U.S. Application Data

(63) Continuation of application No. 13/109,363, filed on May 17, 2011, now Pat. No. 8,553,981.

(51) Int. Cl.
*G06K 9/00* (2006.01)
*G06F 17/30* (2006.01)

(52) U.S. Cl.
CPC .... *G06F 17/30256* (2013.01); *G06F 17/30253* (2013.01); *G06F 17/30259* (2013.01); *G06K 9/00335* (2013.01)
USPC .......................................... 382/173; 707/706

(58) Field of Classification Search
USPC ................. 382/164, 173, 282, 305, 306, 312; 700/2; 707/706, 713, 763, 765, 767; 345/428; 235/462.45
See application file for complete search history.

(56) References Cited

U.S. PATENT DOCUMENTS

| 7,050,989 B1 * | 5/2006 | Hurt et al. .................. 705/14.51 |
| 7,289,806 B2 | 10/2007 | Morris et al. |
| 7,478,091 B2 | 1/2009 | Mojsilovic et al. |
| 7,627,565 B2 | 12/2009 | Budzik et al. |

(Continued)

OTHER PUBLICATIONS

Bartolini, "Image Querying," retrieved on Jan. 7, 2011 at <<http://www-db.deis.unibo.it/research/papers/EoDBS.ImageQuerying09.pdf>>, 6 pages.

(Continued)

*Primary Examiner* — Kanjibhai Patel
(74) *Attorney, Agent, or Firm* — Carole A Boelitz; Micky Minhas; Lee and Hayes, PLLC (57) ABSTRACT

A user may perform an image search on an object shown in an image. The user may use a mobile device to display an image. In response to displaying the image, the client device may send the image to a visual search system for image segmentation. Upon receiving a segmented image from the visual search system, the client device may display the segmented image to the user who may select one or more segments including an object of interest to instantiate a search. The visual search system may formulate a search query based on the one or more selected segments and perform a search using the search query. The visual search system may then return search results to the client device for display to the user.

18 Claims, 4 Drawing Sheets

(56) References Cited

U.S. PATENT DOCUMENTS

| | | | |
|---|---|---|---|
| 7,734,804 B2* | 6/2010 | Lorenz et al. | 709/231 |
| 7,775,437 B2* | 8/2010 | Cohen | 235/462.45 |
| 7,962,504 B1 | 6/2011 | Mehanna | |
| 8,185,543 B1 | 5/2012 | Choudhry et al. | |
| 2003/0013951 A1* | 1/2003 | Stefanescu et al. | 600/407 |
| 2003/0195883 A1 | 10/2003 | Mojsilovic et al. | |
| 2004/0267740 A1 | 12/2004 | Liu et al. | |
| 2006/0101060 A1 | 5/2006 | Li et al. | |
| 2008/0144943 A1 | 6/2008 | Gokturk et al. | |
| 2008/0226119 A1 | 9/2008 | Candelore et al. | |
| 2011/0128288 A1* | 6/2011 | Petrou et al. | 345/428 |
| 2012/0294520 A1 | 11/2012 | Mei et al. | |

OTHER PUBLICATIONS

Boujemaa et al., "Partial visual selection for explicit query," retrieved on Jan. 7, 2011 at <<http://www-rocq.inria.fr/imedia/partialqueries.html>>, 7 pages.

Deng et al., "An efficient low dimensional color indexing scheme for region-based image retrieval," (c) 1999, IEEE, retrieved from <<http://ieeexplore.ieee.org/stamp/stamp.jsp?arnumber=00757476>>, 4 pages.

Google Goggles—Wikipedia, the free encyclopedia, retrieved on Feb. 10, 2011 at <<http://en.wikipedia.org/wiki/Google_Goggles>>, 3 pages.

Nist'er et al., "Scalable Recognition with a Vocabulary Tree," Proceedings of the 2006 IEEE Computer Society Conference on Computer Vision and Pattern Recognition (CVPR'06), (c) 2006, IEEE, retrieved at <<http://ieeexplore.ieee.org/stamp/stamp.jsp?tp=&arnumber=1641018>>, 8 pages.

Office action for U.S. Appl. No. 13/109,363, mailed on Apr. 10, 2013, Mei et al., "Gesture-Based Visual Search," 7 pages.

Overview : Google Goggles—Google Mobile Help, retrieved on Feb. 10, 2011 at <<http://www.google.com/support/mobile/bin/answer.py?hl=en&answer=166331>>, 2 pages.

Wang, "Best Visual Search Engines Review: (2) Like.com." Nov. 16, 2008, retrieved at <<http://visionwang.com/2008/11/16/best-visual-search-engines-review-2-likecom/>>, 6 pages.

* cited by examiner

GESTURE-BASED VISUAL SEARCH

RELATED APPLICATION

This application is a continuation of and claims priority to U.S. patent application Ser. No. 13/109,363, filed on May 17, 2011, the disclosure of which is incorporated by reference herein.

BACKGROUND

Mobile devices such as mobile phones have not only become a daily necessity for communication, but also prevailed as portable multimedia devices for capturing and presenting digital photos, playing music and movies, playing games, etc. With the advent of mobile device technology, mobile device vendors have developed numerous mobile applications for various mobile platforms such as Windows Mobile®, Android® and iOS®. Some mobile applications have been adapted from counterpart desktop applications. One example application that has been adapted from a desktop counterpart is a search application. A user may want to perform search related to an image. The user may then type in one or more keywords to the search application of his/her mobile device and perform a text-based search based on the keywords. However, due to a small screen size and small keyboard of the mobile device, the user may find it difficult to perform a text-based search using his/her mobile device.

Some mobile device vendors have improved usability of the search application in the mobile device by allowing a user to perform a voice-based search using voice recognition. A user may provide a voice input to the search application, which may translate the voice input into one or more textual keywords. The search application may then perform a search based on the translated keywords. Although the voice-based search provides an alternative to the text-based search, this voice-based search is still far from perfect. For example, to recognize the voice input accurately, the voice-based search normally requires a quiet background, which may be impractical for a mobile user travelling in a noisy environment.

Furthermore, a user may wish to search for an object in an image or an object in a place where the user is located. However, if the user does not know what the object is, the user may provide an inaccurate or meaningless description to the search application, which may result in retrieving irrelevant information.

SUMMARY

This summary introduces simplified concepts of gesture-based visual search, which is further described below in the Detailed Description. This summary is not intended to identify essential features of the claimed subject matter, nor is it intended for use in limiting the scope of the claimed subject matter.

This application describes example embodiments of gesture-based visual search. In one embodiment, an image may be received from a client with or without contextual information associated with the image. Examples of contextual information associated with the image include, but are not limited to, type information of an object of interest (e.g., a face, a building, a vehicle, text, etc.) in the image and location information associated with the image (e.g., physical location information where the image was captured, virtual location information such as a web address from which the image is available to be viewed or downloaded, etc.).

In response to receiving the image, the image may be segmented into a plurality of segments. In one embodiment, the image may be segmented into a plurality of segments based on the contextual information associated with the image. Upon segmenting the image, part or all of the image may be returned to the client for selection of one or more of the segments. In one embodiment, the selected segment(s) of the image may include an object of interest to a user of the client. Additionally or alternatively, the one or more selected segments of the image may include text associated with the image. A search query may be formulated based on the selected segment(s). In some embodiments, the query may also be based on the received contextual information associated with the image. In some embodiments, the query may be presented to the user of the client device for confirmation of the search query. A search may be performed using the search query to obtain one or more search results, which may be returned to the client.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, a user may find it difficult to perform a search on his/her mobile device using existing mobile search technologies. For example, the user may wish to find more information about an image or an object in the image. The user may perform a search for the image or the object by typing in one or more textual keywords to a textbox of a search application provided in his/her mobile device (e.g., a mobile phone). Given a small screen size and/or a small keyboard (if available) of the mobile device, however, the user may find it difficult to enter the keywords. This situation becomes worse if the one or more textual keywords are long and/or complicated.

Alternatively, the user may input one or more keywords through voice input and voice recognition (if available). However, voice-based search typically requires a quiet background and may become infeasible if the user is currently located in a noisy environment, such as a vehicle or public place.

Worst still, if the user does not know what an object in the image is, the user may not know how to describe the object or the image in order to perform a text-based search or a voice-based search. For example, the user may note an image including a movie actor and may want to find information about this movie actor. The user may, however, not know or remember his name and therefore be forced to quit the search because of his/her lack of knowledge of the name of the actor.

In yet another alternative, the user may perform an image search using the image as a search query. Specifically, the user may provide an image to a search application or a search engine, which retrieves a plurality of database images based on visual features of the provided image. Although such an image search may alleviate the requirement of providing a textual description for the image, the approach becomes cumbersome if the image is not a stored image in the mobile device (e.g., an image shown in a web page of a web browser). Using current image search technologies, the user would first need to download the image manually from the web page and then manually upload the image to the search application or the image search engine. Furthermore, if the user is only interested in obtaining information about an object shown in the image, visual details of the image other than the object itself constitute noise to the image search and may lead to retrieval of images that are irrelevant so the search.

This disclosure describes a gesture-based visual search system, which instantiates a search query related to an object of interest shown in an image by receiving a segment of an image that is of interest.

Generally, a client device may obtain an image, for example, from a user. The image may include, but is not limited to, an image selected from a photo application, an image or photo captured by the user using a camera of the client device, an image frame of a video played on the client device, an image displayed in an application such as a web browser which displays a web page including an image, or an image (e.g., web pages, videos, images, eBooks, documents, slide shows, etc.) from media stored on or accessible to the client device.

Upon obtaining the image, the client device may send the image or location information of the image to a gesture-based visual search system for image segmentation. The location information of the image may include, but is not limited to, a web link at which the image can be found. In one embodiment, the client device may send the image or the location information of the image to the gesture-based visual search system automatically. In another embodiment, the client device may send the image or the location information of the image to the gesture-based visual search system upon request. For example, in response to receiving a request for image segmentation (such as clicking a designated button of the client device or a designated icon displayed on the client device) from the user, the client device may send the image or the location information of the image to the gesture-based visual search system.

In some embodiments, prior to sending the image or the location information of the image to the gesture-based visual search system for image segmentation, the client device may display the image to the user. Additionally or alternatively, the client device may display the image to the user only upon segmenting the image into a plurality of segments.

Additionally, the client device may further send contextual information associated with the image to the gesture-based visual search system. In one embodiment, the contextual information associated with the image may include, but is not limited to, data captured by sensors of the client device such a Global Positioning System (i.e., GPS), a clock system, an accelerometer and a digital compass, and user-specified and/or service-based data including, for example, weather, schedule and traffic data. In an event that personal information about the user such as GPS data is collected, the user may be prompted and given an opportunity to opt out of sharing or sending such information as personally identifiable information from the client device.

Additionally or alternatively, the contextual information associated with the image may further include information of an object of interest shown in the image. By way of example and not limitation, the information of the object of interest may include, but is not limited to, type information of an object (e.g., a face, a person, a building, a vehicle, text, etc.) in the image. In one embodiment, the user may provide this information of the object of interest to the client device. Additionally or alternatively, the client device may determine the information of the object of interest without human intervention. By way of example and not limitation, the client device may determine the information of the object of interest based on contextual information associated with an application displaying the image or content that is displayed along with the image. For example, the application may be a web browser displaying a web page. The web page may include an article describing a movie actor and may include an image. In response to detecting the image, the client device may determine that the object of interest depicts the movie actor and the type information of the object of interest corresponds to a person based on the content of the article shown in the web page of the web browser.

In response to receiving the image from the client device, the gesture-based visual search system may segment the image into a plurality of segments. In an event that location information of the image rather than the image itself is received from the client device, the gesture-based visual search system may obtain the image based on the location information. By way of example and not limitation, the gesture-based visual search system may download the image at a location specified in the location information of the image.

In one embodiment, the gesture-based visual search system may segment the image based on a J-measure based segmentation method (i.e., JSEG segmentation method). For example, the JSEG segmentation method may first quantize colors of the received image into a number of groups that can represent different spatial regions of the received image, and classify individual image pixel based on the groups. Thereafter, the JSEG segmentation method may compute a proposed gray-scale image whose pixel values are calculated from local window and name the proposed gray-scale image as a J-image. The JSEG segmentation method may then segment J-image based on a multi-scale region growing method.

Additionally or alternatively, the gesture-based visual search system may segment the image based on contextual information associated with the image. By way of example and not limitation, the gesture-based visual search system may receive contextual information associated with the image (e.g., type information of the object of interest shown in the image). The gesture-based visual search system may then segment the image by detecting and segmenting one or more objects having a type determined to be the same as a type indicated in the type information from the image. For example, the type information may indicate that the object of interest is a face (i.e., the object type is a face type). The gesture-based visual search system may employ object detection and/or recognition with visual features (e.g., facial features for a face, etc.) specified to the type indicated in the received type information and segment the detected and/or recognized objects from other objects and/or background in the image.

Upon segmenting the image into a plurality of segments, the gesture-based visual search system may return the segmented image (i.e., all segments in respective original locations) to the client device. Alternatively, the gesture-based visual search system may return parts of the segmented image to the client device in order to save network bandwidth between the client device and the gesture-based visual search system. For example, the gesture-based visual search system may return segments including or substantially including the object of interest but not the background to the client device. Additionally or alternatively, the gesture-based visual search system may return (all or part of) the segmented image in a resolution that is lower than the original resolution of the received image.

In response to receiving all or part of the segmented image, the client device may then display all or part of the segmented image age at corresponding location of the original image. In one embodiment, this process of image segmentation may be transparent to the user. In another embodiment, the client device may notify the user that the image is successfully segmented into a plurality of segments.

In either case, the user may be allowed to select one or more segments from the plurality of segments of the image based on an input gesture. By way of example and not limitation, the user may select the one or more segments by tapping on the one or more segments (e.g., tapping on a touch screen of the client device at locations of the one or more segments). Additionally or alternatively, the user may select the one or more segments by drawing a shape (e.g., a rectangle, a circle, or any freeform shape), for example, on the touch screen of the client device to bound or substantially bound the one or more segments. Additionally or alternatively, the user may select the one or more segments by cycling through the received segments of the segmented image using, for example, a thumb wheel. Additionally or alternatively, the user may select the one or more segments by using a pointing device such as a stylus or mouse, etc.

In response to receiving selection of the one or more segments from the user, the client device may provide confirmation to the user of his/her selection. In one embodiment, the client device may highlight the one or more selected segments by displaying a shape (e.g., a rectangle, a circle or a freeform shape, etc.) that bounds or enclose the one or more selected segments. Additionally or alternatively, the client device may display one or more individual bounding shapes to bound or enclose the one or more selected segments individually.

Additionally or alternatively, in response to receiving selection of the one or more segments from the user, the client device may send information of the one or more selected segments to the gesture-based visual search system in order to formulate an image search query based on the one or more selected segments. In one embodiment, the client device may send the actual one or more selected segments to the gesture-based visual search system. In another embodiment, the client device may send coordinates of the one or more selected segments relative to a position in the image (e.g., top left corner of the image) to the gesture-based visual search system. In one embodiment, the one or more selected segments may include an object of interest to the user. Additionally or alternatively, the one or more selected segments may include text to be recognized.

Upon receiving the one or more selected segments from the client device, the gesture-based visual search system may formulate a search query based on the one or more selected segments. In one embodiment, the gesture-based visual search system may extract visual features from the one or more selected segments. The gesture-based visual search system may employ any conventional feature extraction method to extract the features from the one or more selected segments. By way of example and not limitation, the gesture-based visual search system may employ generic feature detection/extraction methods, e.g., edge detection, corner detection, blob detection, ridge detection and/or scale-invariant feature transform (SIFT). Additionally or alternatively, the gesture-based visual search system may employ shape-based detection/extraction methods such as thresholding, blob extraction, template matching, and/or Hough transform. Additionally or alternatively, the gesture-based visual search system may employ any other feature extraction methods including, for example, attention guided color signature, color fingerprint, multi-layer rotation invariant EOH (i.e., edge orientation histogram), histogram of gradients, Daubechies wavelet, facial features and/or black & white.

In one embodiment, rather than employing generic or unspecified feature extraction methods, the gesture-based visual search system may employ one or more feature extraction methods that are specific to detecting and/or extracting visual features of the object of interest shown in the one or more selected segments. Specifically, the gesture-based visual search system may determine which feature extraction method to be used with which type of features, based on the received contextual information (e.g., the type information).

By way of example and not limitation, if type information of an object of interest shown in the image is received and indicates that the object of interest is of a particular type (e.g., a face type), the gesture-based visual search system may employ a feature extraction method that is specified to detect and/or extract features of that particular type (e.g., facial features) in order to detect or recognize the object of interest (e.g., faces) in the one or more selected segments. For example, if the type information indicates that the object of interest is a building, the gesture-based visual search system may employ a feature extraction method with features specified to detect and/or extract edges and/or shapes of building(s) in the one or more selected segments.

Upon extracting visual features from the one or more selected segments of the image, the gesture-based visual search system may compare the extracted visual features with a codebook of features to obtain one or more visual words for representing the one or more selected segments. A codebook of features, sometimes called a codebook of visual words, may be generated, for example, by clustering visual features of training images into a plurality of clusters. Each cluster or visual word of the codebook may be defined by, for example, an average or representative feature of that particular cluster.

Alternatively, the gesture-based visual search system may compare the extracted visual features of the one or more selected segments with a visual vocabulary tree. A visual vocabulary tree may be built by applying a hierarchical k-means clustering to visual features of a plurality of training images. Visual words of the visual vocabulary tree may then be obtained based on results of the clustering.

In response to obtaining one or more visual words for the one or more selected segments, the gesture-based visual search system may formulate a search query based on the one or more visual words. In one embodiment, the gesture-based visual search system may retrieve a plurality of images from a database based on the one or more visual words for the one or more selected segments. Additionally, the gesture-based visual search system may further obtain web links and textual information related to the one or more selected segments from the database.

Additionally or alternatively, the gesture-based visual search system may detect text in the one or more selected segments and perform object character recognition for the one or more selected segments (e.g., a street sign, a label, etc.). Upon recognizing the text in the one or more selected segments, the gesture-based visual search system may perform a text-based search and retrieve one or more Images, web links and/or textual information, etc., for the one or more selected segments.

Additionally, the gesture-based visual search system may further examine the plurality of retrieved images and obtain additional information associated with the plurality of retrieved images. By way of example and not limitation, the additional information associated with the plurality of retrieved images may include textual descriptions of the plurality of retrieved images, location information of the plurality of retrieved images and/or time stamps of the plurality of retrieved images, etc. The gesture-based visual search system may further retrieve additional images from the database or from a text-based search engine using this additional information of the plurality of retrieved images.

Upon retrieving search results (e.g., the plurality of retrieved images, web links, etc.) for the one or more selected segments, the gesture-based visual search system may return the search results to the client device which may then display the search results to the user. The user may click on any of the search results to obtain detailed information. Additionally or alternatively, the user may perform another search (e.g., an image search or a text search) by tapping on an image (or a segment of the image if automatic image segmentation has been performed for the image) or a text of the search results.

The described system allows a user to conduct a search (e.g., an image search or a text search) without manually downloading and uploading an image to a search application or a search engine. The described system further allows the user to conduct an image search based on a portion of the image (e.g., an object shown in the image) without requiring the user to manually segment the desired portion from the image himself/herself. This, therefore, increases the usability of a search application of a mobile device and alleviates the cumbersome process of providing textual keywords to the mobile device, thus enhancing user search experience with the mobile device.

While in the examples described herein, the gesture-based visual search system segments images, extracts features from the images, formulates a search query based on the extracted features, and performs a search based on the search query, in other embodiments, these functions may be performed by multiple separate systems or services. For example, in one embodiment, a segmentation service may segment the image, while a separate service may extract features and formulate a search query, and yet another service (e.g., a conventional search engine) may perform the search based on the search query.

The application describes multiple and varied implementations and embodiments. The following section describes an example environment that is suitable for practicing various implementations. Next, the application describes example systems, devices, and processes for implementing a gesture-based visual search system.

Exemplary Architecture

Figure 1:
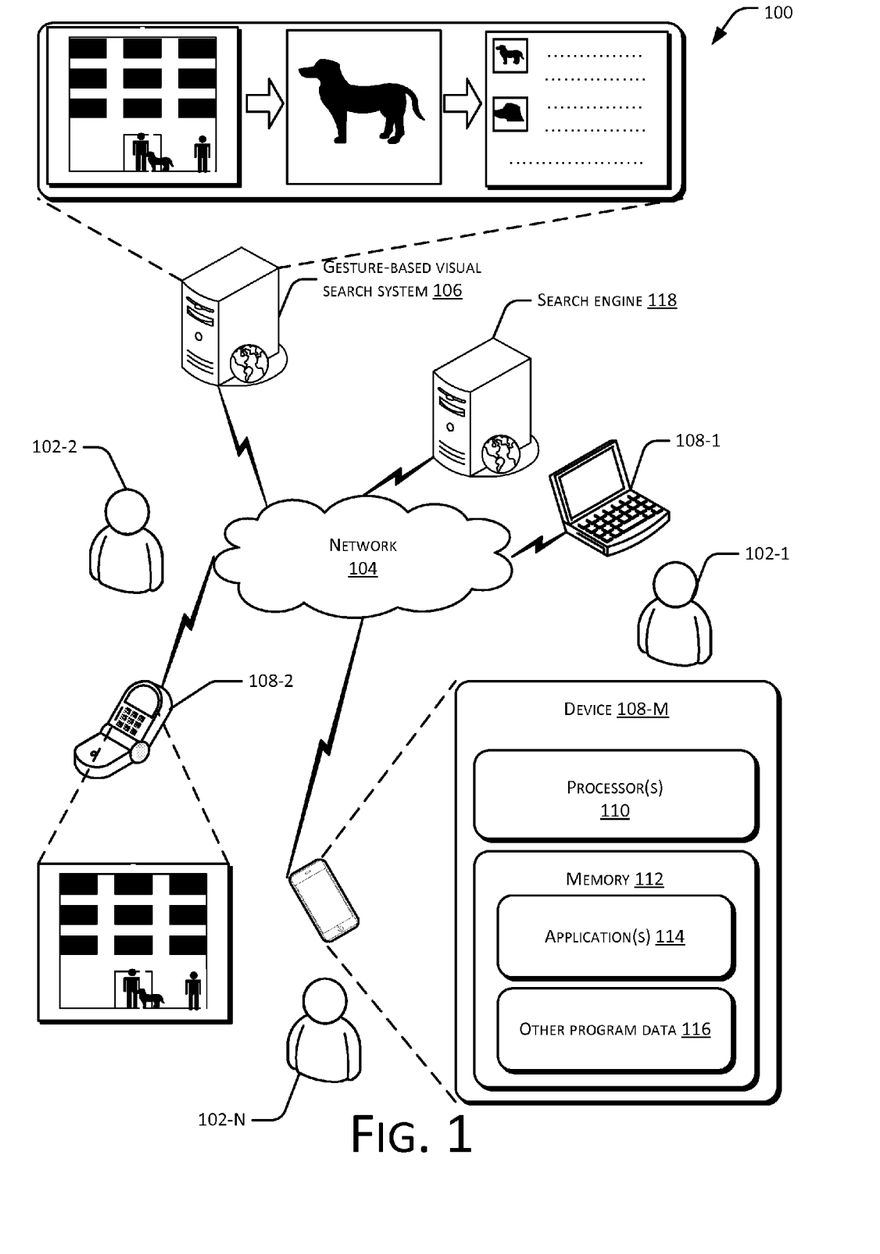
FIG. 1 illustrates an example environment including an example gesture-based visual search system.

FIG. 1 illustrates an exemplary environment 100 usable to implement a gesture-based visual search system. The environment 100 includes one or more users 102-1, 102-2, . . . 102-N (which are collectively referred to as 102), a network 104 and a gesture-based visual search system 106. The user 102 may communicate with the gesture-based visual search system 106 through the network 104 using one or more client devices 108-1, 108-2, . . . 108-M, which are collectively referred to as 108.

The client devices 108 may be implemented as any of a variety of conventional computing devices including, for example, a personal computer, a notebook or portable computer, a handheld device, a netbook, an Internet appliance, a portable reading device, an electronic book reader device, a tablet or slate computer, a television, a set-top box, a game console, a mobile device (e.g., a mobile phone, a personal digital assistant, a smart phone, etc.), a media player, etc. or a combination thereof.

The network 104 may be a wireless or a wired network, or a combination thereof. The network 104 may be a collection of individual networks interconnected with each other and functioning as a single large network (e.g., the Internet or an intranet). Examples of such individual networks include, but are not limited to, Personal Area Networks (PANs), Local Area Networks (LANs), Wide Area Networks (WANs), and Metropolitan Area Networks (MANs). Further, the individual networks may be wireless or wired networks, or a combination thereof.

In one embodiment, the client device 108 includes a processor 110 coupled to memory 112. The memory 112 includes one or more applications 114 (e.g., a search application, a viewfinder application, a media player application, a photo album application, a web browser, etc.) and other program data 116. The memory 112 may be coupled to or associated with, and/or accessible to other devices, such as network servers, routers, and/or other client devices 108.

The user 102 may view an image using the application 114 of the client device 108. In response to detecting the image, the client device 108 or one of the applications 114 may send the image to the gesture-based visual search system 106 for image segmentation. The gesture-based visual search system 106 may segment the image into a plurality of segments, and return some or all of the segments to the client device 108. For example, the gesture-based visual search system 106 may only return segments including or substantially including an object of interest to the user 102 but not the background or other objects that are not of interest to the user 102.

In response to receiving the segmented image (i.e., some or all of the segments) from the gesture-based visual search system 106, the user 102 may select one or more segments from the received segments. The client device 108 may then send the one or more selected segments to the gesture-based visual search system 106 to instantiate a search. The gesture-based visual search system 106 may formulate a search query based on the one or more selected segments and retrieve search results using the search query. In one embodiment, the gesture-based visual search system 106 may retrieve search results from a database (not shown) included in the gesture-based visual search system 106. Additionally or alternatively, the gesture-based visual search system 106 may retrieve the search results from a search engine 118 external to the gesture-based visual search system 106. The gesture-based visual search system 106 may then return the search results to the client device 108 for display to the user 102.

Although the gesture-based visual search system 106 and the client device 108 are described to be separate systems, the present disclosure is not limited thereto. For example, some or all of the gesture-based visual search system 106 may be included in the client device 108, for example, as software and/or hardware installed in the client device 108. In some embodiments, one or more functions (e.g., an image segmentation function, a feature extraction function, a query formulation function, etc.) of the gesture-based visual search system 106 may be integrated into the client device 108.

Figure 2:
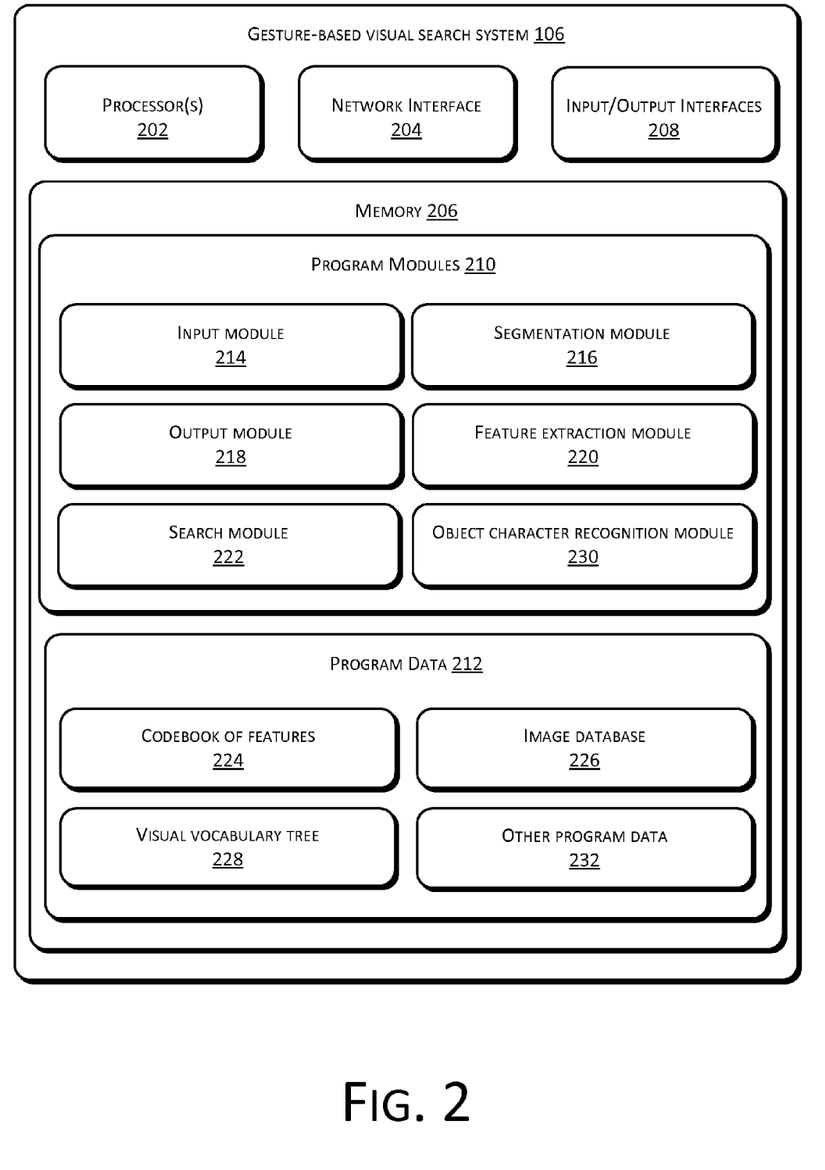
FIG. 2 illustrates the example gesture-based visual search system of FIG. 1 in more detail.

FIG. 2 illustrates the gesture-based visual search system 106 in more detail. In one embodiment, the system 106 can include, but is not limited to, one or more processors 202, a network interface 204, memory 206, and an input/output interface 208. The processor 202 is configured to execute instructions received from the network interface 204, received from the input/output interface 208, and stored in the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the gesture-based visual search system 106 may include an input module 214. The input module 214 may receive an image or location information of an image (e.g., a link at which the image can be found and downloaded) from the client device 108. Additionally, the input module 214 may further receive contextual information associated with the image from the client device 108. Contextual information associated with the image may include, but is not limited to, data captured by sensors of the client device such a Global Positioning System (i.e., GPS), a clock system, an accelerometer and a digital compass, and user-specified and/or service-based data including, for example, weather, schedule and/or traffic data. Additionally or alternatively, the contextual information associated with the image may further include information of an object of interest shown in the image. By way of example and not limitation, the information of the object of interest may include, but is not limited to, type information of an object (e.g., a face, a person, a building, a vehicle, text, etc.).

In one embodiment, the gesture-based visual search system 106 may further include a segmentation module 216. Upon receiving the image (and possibly contextual information associated with the image), the input module 214 may send the image (and the contextual information associated with the image if received) to the segmentation module 216. The segmentation module 216 may segment the image into a plurality of segments. In one embodiment, the segmentation module 216 may employ any conventional segmentation method to segment the image. By way of example and not limitation, the segmentation module 216 may segment the image based on JSEG segmentation method. Additional details of the JSEG segmentation method may be found in "Color Image Segmentation," which was published in Proc. IEEE CVPR, 1999, page 2446.

Additionally or alternatively, the segmentation module 216 may segment the image into a predetermined number of segments based on one or more criteria. Examples of the one or more criteria include, but are not limited to, file size of the image, resolution of the image, etc.

Additionally or alternatively, the segmentation module 216 may segment the image based on the contextual information associated with the image. By way of example and not limitation, the gesture-based visual search system 106 may receive contextual information associated with the image (e.g., type information of an object of interest shown in the image). The segmentation module 216 may then segment the image by detecting and segmenting one or more objects having a same type as a type indicated in the type information from the image. For example, the type information may indicate that the object of interest is a face or the object type is a face type. The segmentation module 216 may employ object detection and/or recognition with visual features (e.g., facial features for a face, etc.) of the type indicated in the received type information, and may segment the detected and/or recognized objects from other objects and/or background in the image.

In response to segmenting the image into a plurality of segments, the gesture-based visual search system 106 may return some or all of the segmented image (i.e., some or all of the plurality of segments) to the client device 108 through an output module 218.

After sending some or all of the segmented image to the client device 108, the input module 214 may receive information of one or more segments selected by the user 102 from the client device 108 to instantiate a search. In one embodiment, the information of the one or more selected segments may include the actual one or more segments selected by the user 102. In another embodiment, the information of the one or more selected segments may include coordinates of the one or more selected segments relative to a position in the image (e.g., top left corner of the image). In either case, the one or more selected segments may include an object of interest to the user 102. Additionally or alternatively, the one or more selected segments may include text to be recognized.

In response to receiving the information of the one or more selected segments from the client device 108, the gesture-based visual search system 106 may include a feature extraction module 220 to extract visual features from the one or more selected segments. In one embodiment, the feature extraction module 220 may employ any conventional feature extraction method to extract visual features from the one or more selected segments. By way of example and not limitation, the feature extraction module 220 may employ generic feature detection/extraction methods, e.g., edge detection, corner detection, blob detection, ridge detection and/or scale-invariant feature transform (SIFT). Additionally or alternatively, the feature extraction module 220 may employ shape-based detection/extraction methods such as thresholding, blob extraction, template matching, and/or Hough transform. Additionally or alternatively, the feature extraction module 220 may employ any other feature extraction methods including, for example, attention guided color signature, color fingerprint, multi-layer rotation invariant EOH, histogram of gradients, Daubechies wavelet, facial features and/or black & white.

In one embodiment, rather than employing generic or unspecified feature extraction methods, the feature extraction module 220 may employ one or more feature extraction methods that are specific to detecting and/or extracting visual features of an object of interest shown in the one or more selected segments. Specifically, the feature extraction module 220 may determine which feature extraction method to use with which type of features, based on the received contextual information (e.g., the type information).

By way of example and not limitation, if type information of an object of interest shown in the image is received and indicates that the object of interest is of a particular type (e.g., a face type), the feature extraction module 220 may employ a feature extraction method that is specified to detect and/or extract features of that particular type (e.g., facial features) in order to detect or recognize the object of interest (e.g., faces) in the one or more selected segments. For example, if the type information indicates that the object of interest is a building, the feature extraction module 220 may employ a feature extraction method with features specified to detecting and/or extracting edges and/or shapes of building(s) in the one or more selected segments.

Upon extracting visual features from the one or more selected segments, the gesture-based visual search system 106 may include a search module 222 for formulating a search query and performing a search based on the search query. In one embodiment, the search module 222 may compare the extracted visual features with a codebook of features 224 to obtain one or more visual words for representing the one or more selected segments. The codebook of features 224, sometimes called a codebook of visual words, may be generated, for example, by clustering visual features of training images stored in an image database 226. Each cluster or visual word of the codebook of features 224 may be defined by, for example, an average or representative feature of that particular cluster.

Additionally or alternatively, the search module 222 may compare the extracted visual features of the one or more selected segments with a visual vocabulary tree 228. The visual vocabulary tree 228 may be built by applying a hierarchical k-means clustering to visual features of a plurality of training images stored in the image database 226. Visual words of the visual vocabulary tree may then be obtained based on results of the clustering. Detailed descriptions of this visual vocabulary tree may be found in "Scalable recognition with a vocabulary tree," which was published in Proc. IEEE CVPR 2006, pages 2161-2168.

In response to obtaining one or more visual words (from the codebook of features 224 or the visual vocabulary tree 228) for the one or more selected segments, the search module 222 may formulate a search query based on the one or more visual words. In one embodiment, the search module 222 may use the one or more visual words to retrieve a plurality of images from the image database 226 or the search engine 118 external to the gesture-based visual search system 106. Additionally, the search module 222 may further obtain web links and textual information related to the one or more selected segments from the image database 226 or the search engine 118.

Additionally or alternatively, the one or more selected segments may include text. The gesture-based visual search system 106 may further include an object character recognition module 230 to recognize text in the one or more selected segments. In one embodiment, prior to recognizing the text, the object character recognition module 230 may determine a text orientation of the text in the one or more selected segments. By way of example and not limitation, the object character recognition module 230 may employ PCA (i.e., Principal Component Analysis), TILT (i.e., Transform Invariant Low-ranked Texture) or any other text alignment method to determine the orientation of the text. For example, the object character recognition module 230 may employ PCA to detect two principal component orientations of the text in the one or more selected segments. In response to detecting the two principal component orientations of the text, the object character recognition module 230 may rotate the text, e.g., to align the text horizontally. Additionally or alternatively, the object character recognition module 230 may employ any other text alignment methods such as TILT (i.e., Transform Invariant Low-ranked Texture) to determine the orientation of the text in the one or more selected segments. Detailed descriptions of the TILT text alignment method may be found in "Transform Invariant Low-rank Textures," which was published in Proceedings of Asian Conference on Computer Vision, November 2010.

Additionally or alternatively, the object character recognition module 230 may further receive an indication of the text orientation from the client device 108 through the input module 214. The input module 214 may receive the indication of the text orientation along with the one or more selected segments from the client device 108.

In one embodiment, the user 102 may draw a line (using a finger, a pointing device, etc.) on the screen of the client device 108 to indicate the text orientation of the text within the one or more selected segments. Additionally or alternatively, the user 102 may indicate an estimate of the text orientation by providing an estimate degree of angle of the text orientation with respect to the vertical or horizontal axis of the image. Additionally or alternatively, in some embodiments, the user 102 may indicate the text orientation of the text by drawing a bounding shape (such as a rectangle or substantially rectangular shape, etc.) to bound or substantially bound the text, with the longer edge of the bounding shape indicating the text orientation of the text to be recognized. The client device 108 may then send this user indication of the text orientation to the object character recognition 230 through the input module 214 of the gesture-based visual search system 106.

Upon recognizing text in the one or more selected segments by the object character recognition module 230, the search module 222 may perform a text-based search and retrieve one or more Images, web links and/or textual information, etc., for the one or more selected segments from the image database 226 or the search engine 118.

Additionally, the search module 222 may further examine the plurality of retrieved images and obtain additional information associated with the plurality of retrieved images. By way of example and not limitation, the additional information associated with the plurality of retrieved images may include, but is not limited to, textual descriptions of the plurality of retrieved images, location information of the plurality of retrieved images and time stamps of the plurality of retrieved images, etc. The gesture-based visual search system may further retrieve additional images from the image database 226 or from the search engine 118 using this additional information of the plurality of retrieved images.

In response to receiving search results (e.g., the plurality of database images, web links and/or textual information), the output module 218 may return the search results to the client device 108 for display to the user 102. In one embodiment, the gesture-based visual search system 106 may further receive another segmentation request or search request from the client device 108 or the user 102, and may perform the foregoing operations in response to the request.

Example Image Database

Figure 3A:
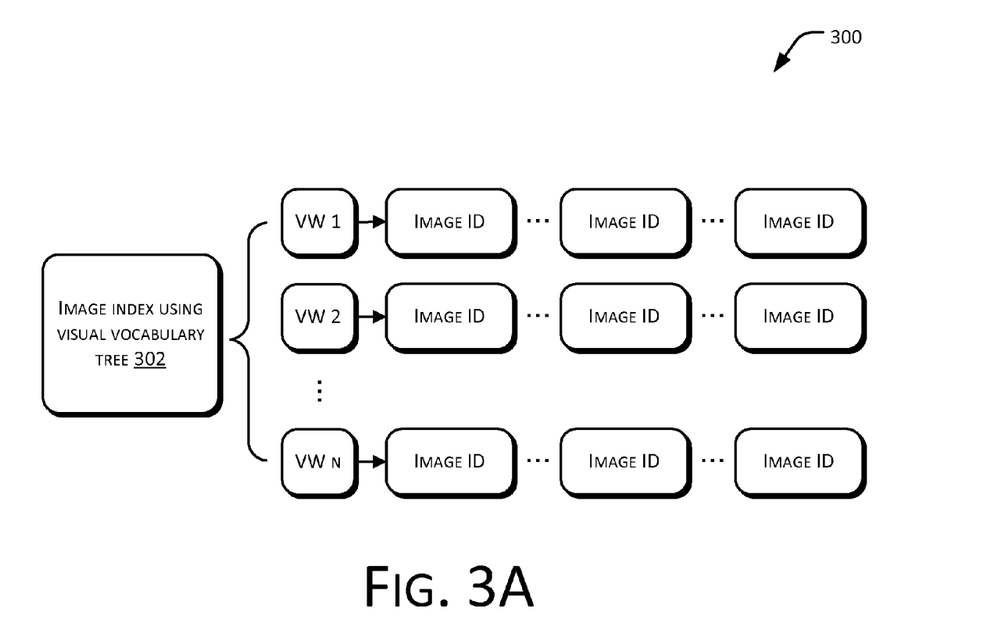
FIG. 3A and FIG. 3B illustrate an example index structure for indexing images in an image database.
Figure 3B:
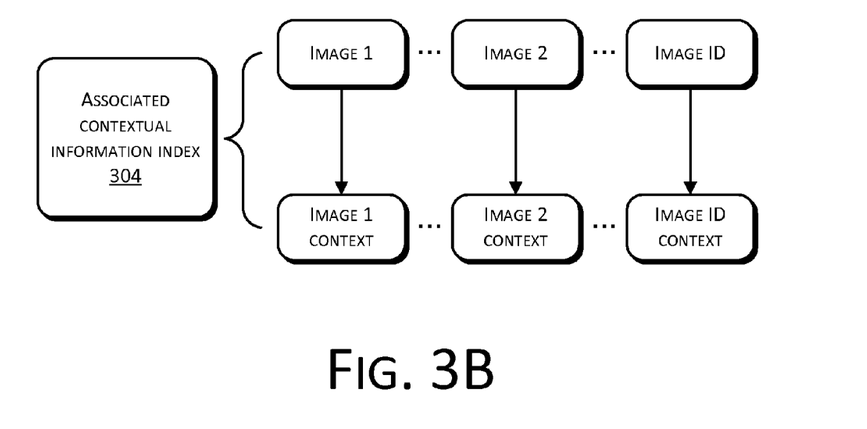

In one embodiment, images in the image database 226 may be indexed. By way of example and not limitation, an image index may be based on invented novel file indexing paradigm. Visual features and contextual information and/or metadata of an image may be used for constructing an image index for that image. In one embodiment, scale-invariant feature transform (SIFT) may be chosen to represent a local descriptor of the image due to its scale, rotation and illumination invariant properties. Prior to constructing the index, the visual vocabulary tree 228 may be built by using a hierarchical k-means clustering while visual words of the visual vocabulary tree 228 may be created based on results of the clustering. During constructing the index, an individual SIFT point of a particular image may be classified as one or more of the visual words (i.e., VW) of the visual vocabulary tree 228. Information of the image may be recorded along with these one or more visual words of the visual vocabulary tree 228 and associated contextual information. FIGS. 3A and 3B show an example index structure 300 of an inverted file indexing paradigm. FIG. 3A shows an inverted file index 302 of visual words for a plurality of images using the visual vocabulary tree 228. FIG. 3B shows an index structure 304 for contextual information associated with each image or image file. Although FIGS. 3A and 3B describe an example index structure, the present disclosure is not limited thereto. The present disclosure can employ any conventional index structure for indexing images in the image database 226.

Example Gesture-Based Visual Search with Contextual Filtering

In one embodiment, a score measurement scheme may be used with contextual filtering. By way of example and not limitation, an example score measurement is given in Equation (1) below, where query q may be defined as one or more segments selected by the user 102 using tap-to-select mechanism from the image or photo taken using the client device 108. The database images (e.g., stored in the image database 226) may be denoted as d. $q_i$ and $d_i$ refer to respective combinations of term-frequency and inverse document frequency (TF-IDF) values for the query q and the database or indexed images d as shown in Equation (2).

$$s(q, d) = \|q - d\|_2^2 \cdot \phi(q) \quad (1)$$
$$= \left( \sum_{i | d_i = 0} |q_i|^2 + \sum_{i | q_i = 0} |d_i|^2 + \sum_{i | q_i \neq 0, d_i \neq 0} |q_i - d_i|^2 \right) \cdot \phi q$$
$$\text{where} \cdot \phi(q) = \begin{cases} 1 & \text{if } q \in Q \\ 0 & \text{if } q \notin Q \end{cases}$$
$$q_i = tf_{q_i} \cdot idf_{q_i}, \, d_i = tf_{d_i} \cdot idf_{d_i} \quad (2)$$

For example, for $q_i$, $tf_q$, may be an accumulated number of local descriptors at a leaf node i of the visual vocabulary tree 228. $idf_q$, may be formulated as $\ln(N/N_i)$, where N is total number of images in the image database 226, for example, and $N_i$ is number of images whose descriptors are classified into the leaf node i.

Additionally, $\phi(q)$, a contextual filter in Equation (1), may be obtained based on contextual information associated with the query or the image from which the one or more segments are selected by the user 102. By way of example and not limitation, this contextual information may include, but is not limited to, location information associated with the image from which the one or more segments are selected by the user 102. For example, the user 102 may use a camera (not shown) of the client device 108 to take a photo of a building such as the Brussels town hall. The location information in form of GPS data may then be sent along with the photo to the gesture-based visual search system 106 for image segmentation and/or image search.

Alternative Embodiments

In one embodiment, the search module 222 of the gesture-based visual search system 106 may retrieve a plurality of database images based on the extracted features of the one or more selected segments and the contextual information associated with the image from which the one or more segments are selected. By way of example and not limitation, the contextual information may include location information of the image from which the image is obtained. For example, the image may be a photo taken at a particular physical location using the client device 108. The client device 108 may record the photo along with GPS data of that particular location. When the search module 222 of the gesture-based visual search system 106 formulates the search query, the search module 222 may formulate the search query based at least in part on the extracted visual features and the GPS data, and retrieve images from the image database 226 or from the search engine 118. For example, the search module 222 may use this GPS data to narrow or limit the search to images having an associated location within a predetermined distance from the location indicated in the GPS data of the image from which the one or more segments are selected.

For another example, the location information in the contextual information associated with the image may be a virtual location (e.g., a web address) from which the image is downloaded or is available for download. When the search module 222 formulates the search query, the search module 222 may access a web page addressed at the virtual location and examine the web page to discover additional information related to the image. The search module 222 may then incorporate any discovered information into the search query to obtain a query that is more desirable to the intent of the user 102. For example, the web page addressed at the virtual address may be a web page describing a movie actor. The search module 222 may determine that the user 102 is actually interested in obtaining more information about this movie actor. The search module 222 may obtain information of this movie actor such as his/her name, movie(s) in which he appeared, etc., from the web page, and formulate a search query based on this obtained information and/or the extracted visual features of the one or more selected segments. The search module 222 may then obtain search results using this search query.

In another embodiment, the gesture-based visual search system 106 may further include other program data 232 storing log data associated with the client device 108. The log data may include, but is not limited to, log information associated with image(s) segmented, segments of the image(s) selected by the user 102 through the client device 108, search results returned to the client device 108 in response to receiving the selected segments, etc. The gesture-based visual search system 106 may use this log data or a predetermined time period of the log data to refine future search queries by the user 102.

In some embodiments, prior to sending the image to the gesture-based visual search system 106, the client device 108 may receive an indication of an object of interest in the image shown on the screen of the client device 108. The user may indicate this object of interest in the image by drawing a line or a bounding shape to bound or substantially bound the object of interest. By way of example and not limitation, the user may draw a circle, a rectangle or any freeform shape to bound or substantially bound the object of interest. In response to receiving this indication, the client device 108 may send the image along with the indication of the object of interest to the gesture-based visual search system 106. Upon obtaining the image and the indication of the object of interest, the gesture-based visual search system 106 may apply image segmentation to an area of the image that corresponds to the indication (i.e., the bounding shape) of the object of interest or an area of the image that is larger than the indication of the object of interest by a predetermined percentage (e.g., 5%, 10%, etc.) without segmenting the rest of the image. This therefore may reduce the time and resource for the image segmentation done by the gesture-based visual search system 106.

In one embodiment, upon obtaining the search results based on the formulated query, the gesture-based visual search system 106 may further re-rank or filter the search results based on the contextual information associated with the image. By way of example and not limitation, the contextual information associated with the image may include location information (e.g., information of a location where the image is captured, or information of a location where the user 102 is interested in), and time information (e.g., a time of day, a date, etc.). For example, the user 102 may visit a city and may want to find a restaurant serving a particular type of dish at that city. The user 102 may provide his/her location information by providing the name of the city to the client device 108, for example. Alternatively, the user 102 may turn on a GPS system of the client device 108 and allow the client device 108 to locate his/her current location. The client device 108 may then send this location information to the gesture-based visual search system together with other information (such as an image, a type of an object of interest, etc.) as described in the foregoing embodiments. Upon obtaining search results for the user 102, the gesture-based visual search system 106 may re-rank the search results based on the location information, e.g., ranking the search results according to associated distances from the location indicated in the location information. Additionally or alternatively, the gesture-based visual search system 106 may filter the search results and return only those search results having associated location within a predetermined distance from the location indicated in the received location information.

Exemplary Methods

Figure 4:
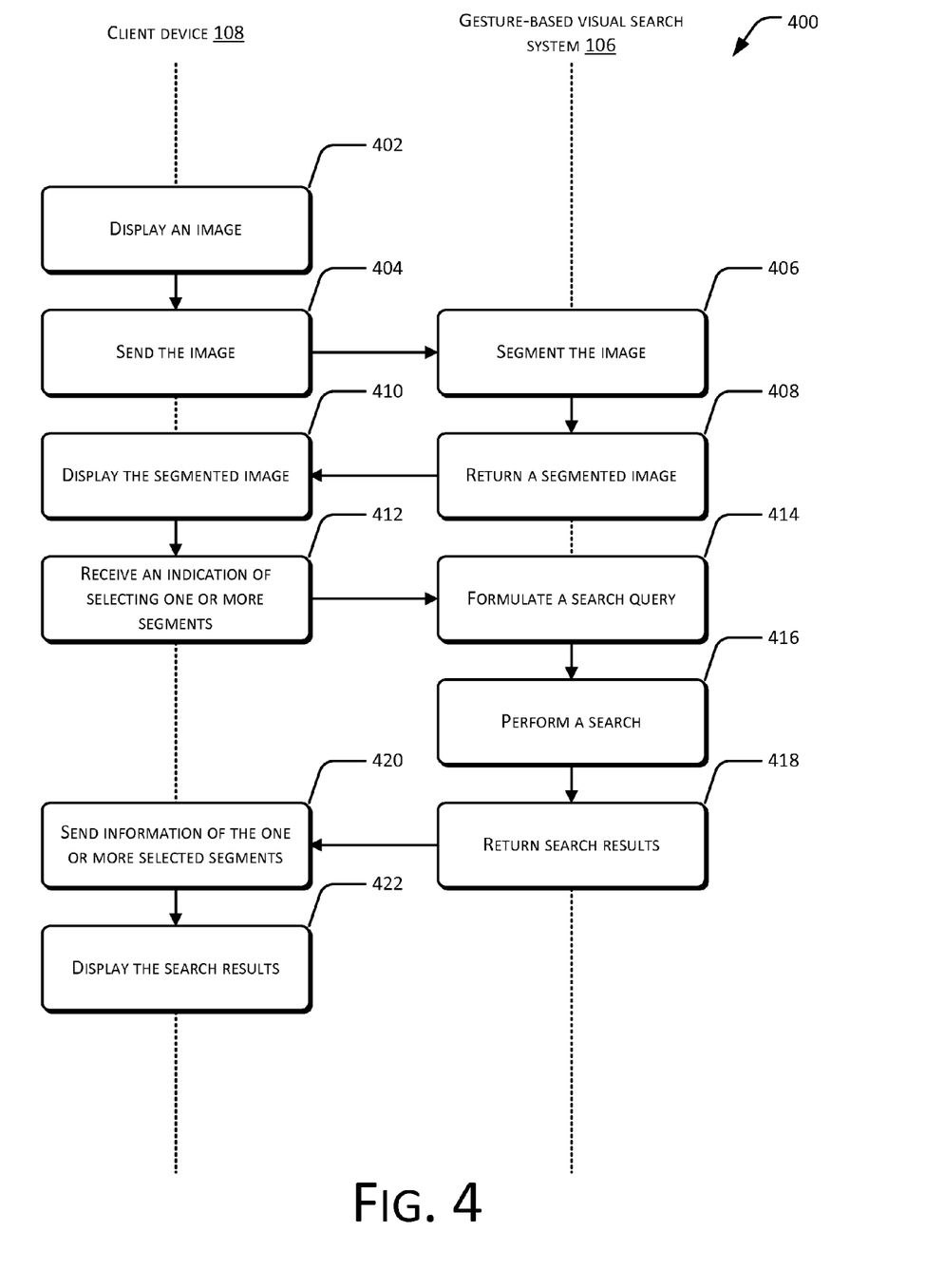
FIG. 4 illustrates an example method of performing a gesture-based visual search.

FIG. 4 is a flow chart depicting an example method 400 of gesture-based visual search. The method of FIG. 4 may, but need not, be implemented in the environment of FIG. 1 and using the system of FIG. 2. For ease of explanation, method 400 is described with reference to FIGS. 1 and 2. However, the method 400 may alternatively be implemented in other environments and/or using other systems.

Method 400 is described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 4, at block 402, the client device 108 obtains an image. By way of example and not limitation, the client device 108 may obtain an image by capturing the image through a camera of the client device 108, selecting the image from a photo application of the client device 108; or selecting the image from media (e.g., web pages, videos, images, eBooks, documents, slide shows, etc.) stored on or accessible to the client device.

At block 404, the client device 108 presents the image to the user 102. In an alternative embodiment, block 404 may be optionally omitted. For example, the client device 108 may present the image to the user 102 only after the client device 108 or the gesture-based visual search system 106 has segmented the image into a plurality of segments.

At block 406, the client device 108 provides the image or information of the image to the gesture-based visual search system 106. In one embodiment, the client device 108 may send the actual image to the gesture-based visual search system 106. Additionally or alternatively, the client device 18 may a link at which the image can be found or located to the gesture-based visual search system 106. The client device 108 may send the image or the information of the image to the gesture-based visual search system 106 automatically or upon request from the user 102. In some embodiments, the client device 108 may further send contextual information such as type information of an object of interest shown in the image to the gesture-based visual search system 106.

At block 408, in response to receiving the image and possibly the contextual information associated with the image, the gesture-based visual search system 106 segments the image into a plurality of segments. In one embodiment, the gesture-based visual search system 106 may segment the image based on a JSEG segmentation method. Additionally or alternatively, the gesture-based visual search system 106 may segment the image based on the received contextual information associated with the image.

At block 410, the gesture-based visual search system 106 returns the segmented image (i.e., the plurality of segments) to the client device 108.

At block 412, the client device 108 displays the segmented image to the user 102.

At block 414, the client device 108 receives an indication of selecting one or more segments by the user 102. For example, the user 102 may tap on one or more segments of the plurality of segments to indicate his/her selection.

At block 416, in response to receiving the indication of selecting the one or more segments by the user 102, the client device 108 sends information of the one or more selected segments to the gesture-based visual search system 106. In one embodiment, the client device 108 may send the actual one or more selected segments to the gesture-based visual search system 106. In another embodiment, the client device 108 may send coordinates of the one or more selected segments with respect to a position of the image (e.g., a top left corner of the image) to the gesture-based visual search system 106.

At block 418, in response to receiving the information of the one or more selected segments from the client device 108, the gesture-based visual search system 106 formulates a search query based on the one or more selected segments. In one embodiment, the gesture-based visual search system 106 may extract visual features of the one or more selected segments and formulate a search query based on the extracted visual features. Additionally or alternatively, the gesture-based visual search system 106 may perform object character recognition (OCR) on the one or more selected segments to recognize a text shown in the one or more selected segments. The gesture-based visual search system 106 may then formulate a search query based on the recognized text in addition to or alternative of the extracted visual features of the one or more selected segments.

At block 420, upon formulating the search query, the gesture-based visual search system 106 performs a search (e.g., an image search, a text search or a combination thereof) based on the search query to obtain search results.

At block 422, the gesture-based visual search system 106 returns the search results to the client device 108.

At block 424, the client device 108 displays the search results to the user 102. The user 102 may then be allowed to browse the search results or instantiate another search by selecting a text, an image, or a segment of the text or the image displayed on the client device 108.

Although the above acts are described to be performed by either the client device 108 or the gesture-based visual search system 106, one or more acts that are performed by the gesture-based visual search system 106 may be performed by the client device 108, and vice versa. For example, rather than sending the image to the gesture-based visual search system 106 for image segmentation, the client device 108 may segment the image on its own.

Furthermore, the client device 108 and the gesture-based visual search system 106 may cooperate to complete an act that is described to be performed by one of the client device 108 and the gesture-based visual search system 106. By way of example and not limitation, the client device 108 may perform a preliminary image segmentation for an image (e.g., in response to a selection of a portion of the image by the user 102), and send the segmented portion of the image to the gesture-based visual search system 106 for further or finer image segmentation.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
under control of one or more processors of a client device that are configured with executable instructions:
displaying an image on a display of the client device, the image including a plurality of segments;
receiving a selection gesture to select one or more segments from the plurality of segments;
receiving contextual information of the image; and
instantiating a search query based on the one or more selected segments and the contextual information of the image.

2. The method as recited in claim 1, further comprising, prior to displaying the image, segmenting, at the client device, the image into the plurality of segments.

3. The method as recited in claim 1, further comprising, prior to displaying the image:
providing the image to a gesture-based visual search system for segmentation; and
receiving the plurality of segments of the image from the gesture-based visual search system.

4. The method as recited in claim 1, further comprising:
sending the search query to a search engine; and
receiving search results from the search engine.

5. The method as recited in claim 1, wherein receiving the selection gesture comprises receiving one or more touch inputs to a user interface of the client device, the one or more touch inputs corresponding to the one or more selected segments.

6. The method as recited in claim 1, wherein receiving the selection gesture comprises receiving a bounding gesture that bounds or substantially bounds the one or more selected segments.

7. The method as recited in claim 1, further comprising, prior to displaying the image:
obtaining the image by:
capturing the image through a camera of the client device;
receiving a selection of the image from a photo application of the client device; or
receiving a selection of the image from media stored on or accessible to the client device.

8. A client device comprising:
a display;
one or more processors;
memory storing executable instructions that, when executed by the one or more processors, cause the one or more processors to perform acts comprising:
displaying an image on the display, the image including a plurality of segments;
receiving a selection gesture to select one or more segments from the plurality of segments;
receiving contextual information of the image; and
instantiating a search query based on the one or more selected segments and the contextual information of the image.

9. The client device as recited in claim 8, the acts further comprising, prior to displaying the image segmenting, at the client device, the image into the plurality of segments.

10. The client device as recited in claim 8, the acts further comprising, prior to displaying the image:
providing the image to a gesture-based visual search system for segmentation; and
receiving the plurality of segments of the image from the gesture-based visual search system.

11. The client device as recited in claim 8, the acts further comprising:
sending the search query to a search engine; and
receiving search results from the search engine.

12. The client device as recited in claim 8, wherein receiving the selection gesture comprises receiving one or more touch inputs to a user interface of the client device, the one or more touch inputs corresponding to the one or more selected segments.

13. The client device as recited in claim 8, wherein receiving the selection gesture comprises receiving a bounding gesture that bounds or substantially bounds the one or more selected segments.

14. The client device as recited in claim 8, the acts further comprising, prior to displaying the image:
   obtaining the image by:
      capturing the image through a camera of the client device;
      receiving a selection of the image from a photo application of the client device; or
         receiving a selection of the image from media stored on or accessible to the client device.

15. One or more computer-storage media configured with computer-executable instructions that, when executed by one or more processors, configure the one or more processors to perform acts comprising:
   receiving an indication of an object of interest in an image that is displayed on a client device;
   sending the indication and the image to a search system; and
   receiving the image having a first area and a second area, the first area being equal to or greater than an area corresponding to the indication of the object of interest and the second area being a remainder of the image that is different from the first area, wherein the first area is segmented without segmenting the second area.

16. The one or more computer-storage media as recited in claim 15, wherein receiving the indication of the object of interest comprises receiving a bounding gesture that substantially bounds the object of interest.

17. The one or more computer-storage media as recited in claim 15, the acts further comprise:
   receiving a selection gesture to select one or more segments from the area corresponding to the indication; and
   instantiating a search query based on the one or more selected segments.

18. The one or more computer-storage media as recited in claim 17, the acts further comprising:
   sending the search query to a search engine; and
   receiving search results from the search engine.

* * * * *